(12) United States Patent
Nielsen et al.

(10) Patent No.: US 12,736,733 B2
(45) Date of Patent: Sep. 15, 2026

(54) ILLUMINABLE GLAZING WITH MULTILAYER LIGHT COUPLING MEANS

(71) Applicant: SAINT-GOBAIN SEKURIT FRANCE, Thourotte (FR)

(72) Inventors: Tobias Nielsen, Herzogenrath (DE); Marcel Klein, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 19/112,115

(22) PCT Filed: Sep. 6, 2023

(86) PCT No.: PCT/EP2023/074412
§ 371 (c)(1),
(2) Date: Mar. 14, 2025

(87) PCT Pub. No.: WO2024/056481
PCT Pub. Date: Mar. 21, 2024

(65) Prior Publication Data

US 2026/0093065 A1 Apr. 2, 2026

(30) Foreign Application Priority Data

Sep. 16, 2022 (EP) .................................... 22196019

(51) Int. Cl.
*F21V 8/00* (2006.01)
*B32B 17/10* (2006.01)

(52) U.S. Cl.
CPC ...... *G02B 6/0025* (2013.01); *B32B 17/10036* (2013.01); *B32B 17/10541* (2013.01); *B32B 2307/7375* (2023.05)

(58) Field of Classification Search
CPC ........ B32B 17/10036; B32B 17/10541; G02B 6/0025
See application file for complete search history.

(56) References Cited

U.S. PATENT DOCUMENTS 4,588,258 A 5/1986 Hoopman
4,775,219 A 10/1988 Appeldorn et al.
(Continued)

FOREIGN PATENT DOCUMENTS

WO WO 2010/049638 A1 5/2010
WO WO 2013/053629 A1 4/2013
(Continued)

OTHER PUBLICATIONS

International Search Report as issued in International Patent Application No. PCT/EP2023/074412, dated Nov. 14, 2023.

*Primary Examiner* — Matthew J. Peerce
(74) *Attorney, Agent, or Firm* — CUSHMAN PARTNERS, LLC

(57) ABSTRACT

A glazing assembly includes a first pane having a first main surface and a second main surface, wherein the first pane is provided to at least partially transmit coupled-in light, a light source for generating light that can be coupled into the first pane, a second pane having a first main surface and a second main surface, an intermediate layer arranged between the first pane and the second pane, and a light coupling unit which is arranged in the intermediate layer, wherein the light coupling unit is formed from a multilayer film, wherein the multilayer film includes at least one carrier layer and a microprism film.

13 Claims, 3 Drawing Sheets

(56) References Cited

U.S. PATENT DOCUMENTS

Figure 1:
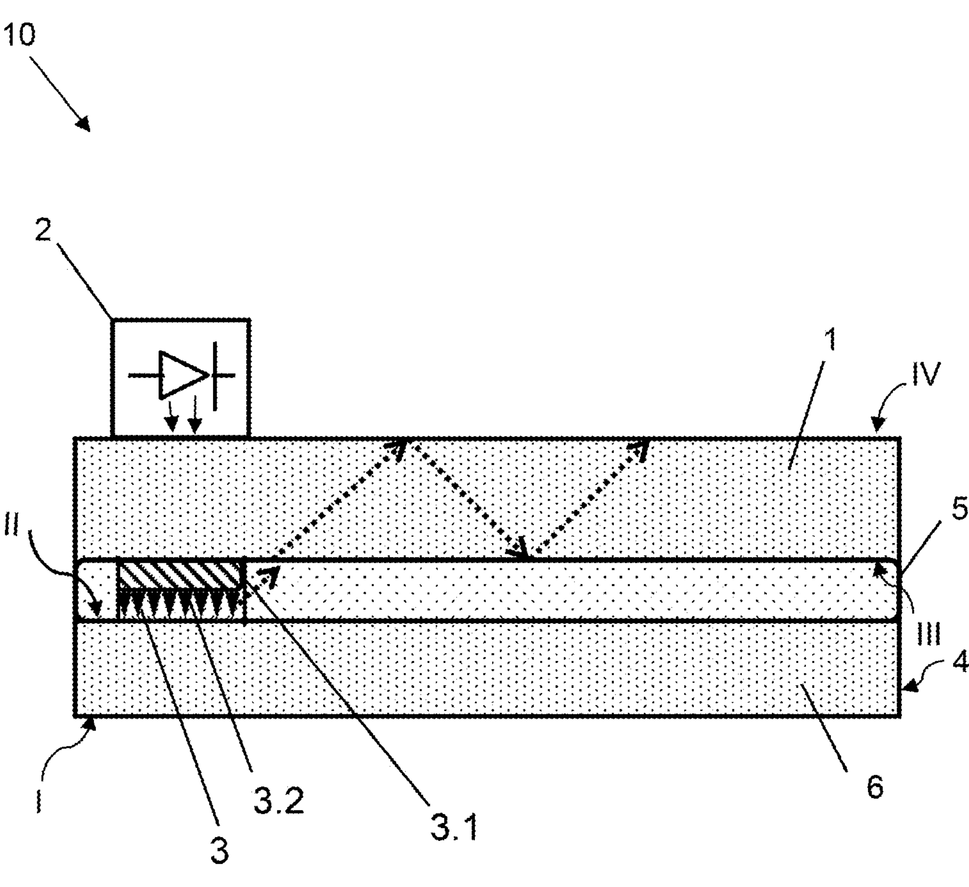

| | | | | |
|---|---|---|---|---|
| 4,895,428 | A | 1/1990 | Nelson et al. | |
| 5,138,488 | A | 8/1992 | Szczech | |
| 5,387,458 | A | 2/1995 | Pavelka et al. | |
| 5,450,235 | A | 9/1995 | Smith et al. | |
| 5,605,761 | A | 2/1997 | Burns et al. | |
| 5,614,286 | A | 3/1997 | Bacon, Jr. et al. | |
| 5,691,846 | A | 11/1997 | Benson, Jr. et al. | |
| 7,794,125 | B2 * | 9/2010 | Offermann | B60Q 3/208 362/490 |
| 12,300,674 | B2 * | 5/2025 | Brandl | H10W 90/00 |
| 2007/0254146 | A1 | 11/2007 | Chuang et al. | |

FOREIGN PATENT DOCUMENTS

| | | | |
|---|---|---|---|
| WO | WO 2013/110885 | A1 | 8/2013 |
| WO | WO 2014/060409 | A1 | 4/2014 |
| WO | WO 2015/095288 | A2 | 6/2015 |
| WO | WO 2018/178591 | A1 | 10/2018 |
| WO | WO 2019/105855 | A1 | 6/2019 |
| WO | WO 2022/096365 | A1 | 5/2022 |

* cited by examiner

ILLUMINABLE GLAZING WITH MULTILAYER LIGHT COUPLING MEANS

CROSS-REFERENCE TO RELATED APPLICATIONS

This application is the U.S. National Stage of PCT/EP2023/074412, filed Sep. 6, 2023, which in turn claims priority to European patent application number 22 196 019.8 filed Sep. 16, 2022. The content of these applications are incorporated herein by reference in their entirety.

The invention relates to a glazing assembly having at least one light source and a film-type multilayer light coupling means, to a method for the production thereof and to the use thereof.

Laminated panes as glazings made of two or more glass or polymeric panes are used in vehicles as windshields, rear panes, side panes, and roof panes. In the case of illuminable or illuminated glazings, light from a light source is coupled into a planar light guide in the form of a pane of the glazing, using total reflection.

WO 2010/049638 A1, WO 2013/053629 A1, WO 2014/060409 A1 or WO 2015/095288 A2 disclose the coupling of light into a glass pane via a side surface. From WO 2013/110885 A1, WO 2018/178591 A1 or WO 2019/105855 A1, it is known to arrange the light source in a recess of a glass pane and thereby couple the light into the pane.

In more recent further developments of such illuminable laminated panes, a light coupling means is arranged opposite the light source. A microprism film, a textured plastic film or a plastic plate having a planar arrangement of microprisms can be used as the light coupling means, which microprisms can be arranged on a continuous intermediate layer of a laminated pane.

However, it has been shown that such an arrangement has a limitation on the height of the usable microprism film, the textured plastic film or the plastic plate with regard to the implementation in known glazing assemblies. If the height of the light coupling means used is in particular greater than approximately 130 μm to 150 μm, insertion into a conventional structure of a glazing assembly with a first pane, intermediate layer and second pane can lead to stresses being produced in the region of the light coupling means, which in the worst case can lead to cracks in one of the panes.

Against this background, the object of the present invention is to provide an improved glazing assembly in which light coupling means having a greater height can also be provided without the occurrence of stresses. At the same time, the glazing assembly should continue to be easy to manufacture using standardised materials for the panes and the intermediate layer.

The object of the present invention is achieved by a glazing assembly according to claim 1 and a method for producing the glazing assembly according to claim 7. Preferred embodiments are apparent from the dependent claims.

The glazing assembly according to the invention comprises at least a first pane and a light source for generating light that can be coupled into the first pane, wherein the pane is provided to at least partially transmit coupled-in light. The first pane has at least a first main surface and a second main surface. Furthermore, the glazing assembly comprises a second pane, also having a first main surface and a second main surface. Arranged between the first pane and the second pane is an intermediate layer in which a light coupling means is arranged.

According to the invention, it is further provided that the light coupling means, which is arranged in the intermediate layer, is formed from a multilayer film, wherein the multilayer film comprises at least one carrier layer and a microprism film.

By arranging a light coupling means formed from a multilayer film in the intermediate layer of the glazing assembly according to the invention, it is advantageously possible to also use, in particular, microprism films having a height greater than 150 μm. Stresses in the finished glazing assembly are avoided. The structure of the light coupling means consisting of at least one carrier layer and a microprism film is crucial not only for the stress-free arrangement of the light coupling means, but also for a simple implementation in known glazing assemblies using standardised materials. This enables the glazing assembly to be manufactured easily and at the same time offers a wide range of design and lighting design variations, because the light coupling means can be provided in any height, shape, length and width in the intermediate layer and thus in the glazing as a whole.

The light coupling means of the present invention can further advantageously contribute to reducing or better dissipating heat generated by the light source. This extends the service life of the illuminated glazing assembly. At the same time, the glazing assembly according to the invention makes it possible to provide light sources with less power than before, which contribute to energy savings, because the light coupling means designed according to the invention contributes to greater brightness in the desired direction of light propagation.

In principle, all electrically insulating substrates that are thermally and chemically stable as well as dimensionally stable under the conditions of production and use of the glazing assembly are suitable as the first pane and the second pane. Preferably, the first and second panes are transparent.

A pane or an object, is understood to be transparent if the pane or the object has a transmittance in the visible spectral range of greater than 20%, preferably 50%, particularly preferably greater than 70%, in particular greater than 85%.

The first pane and/or the second pane preferably contain glass or are preferably made of glass. Soda-lime glass is particularly preferred. However, the panes can also be made of diamond glass, borosilicate glass or quartz glass, or of clear plastics, in particular rigid clear plastics, for example polymethyl methacrylate or polycarbonate. The first pane and/or the second pane are preferably transparent, in particular for the use of the panes as a roof pane, windshield or rear window of a vehicle, or other uses where high light transmittance is desired. In particular, at least the first pane and preferably also the second pane consists of clear glass.

However, for panes that are not situated in the traffic-relevant field of vision of the driver, for example, for roof panels, transmittance can also be much lower, for example, greater than 5%. For this purpose, for example, the second pane and/or the intermediate layer can be tinted or coloured.

The thickness of the first pane and/or the second pane can vary widely and thus be ideally adapted to the requirements of the individual case. Preferably, standard thicknesses of 1 mm to 25 mm, preferably of 1.4 mm to 2.5 mm, are used for vehicle glass, and preferably of 4 mm to 25 mm are used for furniture, equipment and buildings. The size of the panes can vary widely and depends upon the size of the use according to the invention. The first and the second panes have surfaces from 200 cm$^2$ up to 20 m$^2$, as is usual, for example, in vehicle construction and the architectural sector.

The glazing can have any three-dimensional shape. Preferably, the three-dimensional shape has no shadow zones so that they can be coated with further coatings, for example, by cathodic sputtering. Preferably, the panes are planar or slightly or markedly curved in one or more spatial directions. The panes can be colourless or tinted.

The glazing assembly according to the invention comprises a laminated pane. The laminated pane comprises the first pane and the second pane, which are connected to each other via the intermediate layer. Preferably, the two panes and the intermediate layer in between are joined together face-to-face by lamination.

The intermediate layer can be formed from a single thermoplastic layer or from a plurality of thermoplastic layers arranged one above the other. Each thermoplastic layer is typically formed from a thermoplastic film. The thermoplastic layers or films preferably contain or consist of polyvinyl butyral (PVB), ethylene vinyl acetate (EVA) and/or polyurethane (PU). The intermediate layer may be transparent or tinted or coloured, wherein in the case of a plurality of thermoplastic layers, these may be transparent, tinted or coloured independently of one another. The height (also referred to as thickness) of each thermoplastic layer or film is preferably from 0.025 mm to 1 mm, typically 0.38 mm or 0.76 mm.

The terms "first pane" and "second pane" have been chosen in order to differentiate the two panes of a laminated pane according to the invention. No statement about geometric arrangement is associated with the terms. When the laminated pane according to the invention is, for example, provided in an opening in, for example, a vehicle or a building, in order to separate the interior from the external environment, the first pane can face the interior or the external environment.

Furthermore, the first pane and/or the second pane can have further suitable coatings, for example an anti-reflection coating, an anti-adhesion coating, an anti-scratch coating, a photocatalytic coating, a sun protection coating, and/or low-E coating.

Furthermore, the glazing assembly can optionally comprise further functional elements, in particular electronically controllable optical elements, for example PDLC elements, electrochromic elements or the like which are typically arranged in the intermediate layer between the first pane and the second pane.

The light source of the glazing assembly according to the invention comprises at least one or more light-emitting diodes (LEDs). The light source may additionally or alternatively comprise an organic light-emitting diode (OLED) or a laser.

Furthermore, the glazing assembly of the present invention comprises a light coupling means which is arranged in the intermediate layer. The light coupling means is intended to couple the light from the light source into the first pane. The light from the light source is at least partially coupled into the first pane via the light coupling means. This is achieved by light deflection in transmission through the light coupling means or by scattering, diffraction, refraction or reflection at the light coupling means. Preferably, the light coupling takes place by reflection at the light coupling means, in particular at the microprism film of the light coupling means.

In one embodiment, the light source can be arranged on an end face of the first pane or in a cutout (a recess) of the first pane. The light source is preferably arranged adjacent to the light coupling means. In a further embodiment, the light source can be arranged on the main surface facing away from the intermediate layer. The light source is preferably arranged opposite the light coupling means and particularly preferably directly adjoins the main surface of the first pane facing the intermediate layer.

According to the invention, the light coupling means is constructed in multiple layers from a carrier layer and a microprism film. The carrier layer can in particular consist of a thermoplastic polymer material. For the carrier layer, materials that are also used as materials for the intermediate layer are particularly preferred. The carrier layer thus preferably likewise contains or is made of at least one plastics material, preferably polyvinyl butyral (PVB), ethylene vinyl acetate (EVA), and/or polyurethane (PU). The carrier layer can, however, also contain for example polyethylene terephthalate (PET), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The carrier layer can be formed by one or even by a plurality of films arranged one over another, wherein the height of a film is preferably from 0.025 mm to 1 mm, typically 0.38 mm or 0.76 mm.

The carrier layer is preferably glued, laminated or otherwise firmly connected to the microprism film to form the light coupling means. The microprism film itself is particularly known from traffic engineering as reflective film, from lighting technology or from display technology, for example as brightness enhancement film (BEF). This can in particular be a film which comprises a base layer and a microprism layer arranged on the base layer. In this case, in the sense of the present invention, the base layer of the microprism film is, therefore, present in addition to the carrier layer of the light coupling means. In other words, the carrier layer, the base layer and the microprism layer are all comprised in the light coupling means.

The microprism films usable in the sense of the invention are commercially available, for example from the companies 3M, MNTech, Shinwa, Zeon Chemicals, SKC, or Dupont, and illustrative examples of microprism films are also disclosed in the U.S. Pat. Nos. 4,588,258, 4,775,219, 4,895,428, 5,138,488, 5,387,458, 5,450,235, 5,605,761, 5,614,286 and 5,691,846. A scratch-resistant coated microprism film is described, for example, in the publication US 2007/0254146 A1. The prism structures of such a microprism film are in particular transparent and made of a polyacrylate or polycarbonate, for example PMA or PMMA. Typical heights of the prisms are in the range of approx. 20 μm-25 μm. The base layer of a typical microprism film is preferably made of polyacrylate, PET or polycarbonate and its typical height is approx. 100 μm to 150 μm, but it can also be in the range of approx. 30 μm-40 μm.

In a preferred embodiment of the invention, the light coupling means is arranged in a recess of the intermediate layer. This achieves an improved height adjustment between the intermediate layer and the light coupling means. In addition, a simple workflow in industrial production can be achieved by simply inserting the specifically pre-laminated light coupling means into the recess of the intermediate layer. In addition, various design options are open with regard to the shape and surface of the light coupling means and thus to the lighting design in the glazing assembly.

The recess of the intermediate layer is preferably formed by a cutout in at least one thermoplastic layer of the intermediate layer. The light coupling means is therefore preferably arranged in a cutout of at least one thermoplastic layer of the intermediate layer.

The recess can extend through the entire intermediate layer, thus representing a cutout of the entire intermediate layer. This is especially the case if

- the intermediate layer is formed from a single thermoplastic layer (in particular film) which has the cutout, or
- the intermediate layer is formed from a plurality of thermoplastic layers (in particular films), wherein all thermoplastic layers each have a cutout; the cutouts are arranged congruently one above the other and together form the recess of the intermediate layer.

Alternatively, the recess may extend only through part of the intermediate layer. This is particularly the case when the intermediate layer is formed from a plurality of thermoplastic layers (in particular films), wherein

- a single layer has a cutout, while the other layers have no cutout, or
- each of a plurality of adjacent layers has a cutout, but not all layers; the cutouts of the adjacent layers are arranged congruently one above the other.

As described, the light coupling means is preferably arranged in a cutout of at least one thermoplastic layer of the intermediate layer. In a preferred embodiment of the invention, the height of the light coupling means corresponds approximately to the height of said at least one thermoplastic layer of the intermediate layer with the cutout. If the cutout extends through the entire intermediate layer, this corresponds to the height of the intermediate layer. "Approximately" means in particular that the height difference between the light coupling means and said at least one thermoplastic layer corresponds to less than 10% of the height of said at least one thermoplastic layer, preferably less than 5%. In a particularly advantageous embodiment, the height of the light coupling means corresponds to the height of said at least one thermoplastic layer.

In principle, it is also conceivable that the light coupling means has a (significantly) lower height than the said at least one thermoplastic layer having the cutout. However, because this leaves a void in the laminated pane, this is less preferred. This advantageously makes it possible to completely avoid stresses in the glazing assembly, which can lead to a shortening of the service life of the glazing. In addition, further intermediate or functional layers can be arranged on the intermediate layer thus designed using the conventional method.

As described, the intermediate layer may comprise, in addition to the at least one thermoplastic layer having the cutout, further thermoplastic layers (at least one) without a cutout.

In a preferred embodiment, said at least one thermoplastic layer having the cutout in which the light coupling means is arranged directly adjoins the first pane.

The additional thermoplastic layers mentioned can fulfil various functions, for example they can be soundproofing layers. Particularly advantageous are so-called acoustic-damping intermediate layers which preferably consist of three layers of PVB, wherein the middle layer is designed to be softer than the two outer layers.

Said further thermoplastic layer can also have a functional layer, in particular a layer reflecting infrared radiation, a layer absorbing infrared radiation, a layer absorbing UV radiation, an at least sectionally coloured layer, and/or an at least partially tinted layer. For example, the thermoplastic layer can also be a bandpass filter.

This increases the comfort of the glazing assembly without impairing the efficiency of the lighting design by the light coupling means, in particular when the glazing assembly according to the invention is used as a vehicle roof pane.

Furthermore, the glazing assembly can optionally comprise further functional elements, in particular electronically controllable optical elements, for example PDLC elements, electrochromic elements or the like which are typically arranged between the first pane and the second pane (i.e. in the intermediate layer).

In a preferred embodiment of the invention, the light coupling means is arranged in a tinted, untinted and in particular in a blackened region of the intermediate layer. This ensures that the light is guided by the light coupling means exactly at the intended locations in the glazing assembly without causing unwanted radiation losses to the outside or diffuse scattered light, which makes the design of the lighting look washed out or blurred.

In a preferred embodiment of the invention, for example, a PET film having a height of 0.38 mm, 0.5 mm or with a height of 0.76 mm can be provided as a carrier layer for the microprism film for producing the light coupling means.

In a preferred embodiment of the invention, the microprism film of the multilayer film of the light coupling means has a height in the range between 25 μm and 500 μm, preferably between 25 μm and 400 μm, and in particular greater than or equal to 150 μm and less than or equal to 350 μm.

Microprism films having a height in the claimed range are robust and easy to handle, especially with regard to cutting into various shapes by machines. With thinner or thicker films, successful lamination with the carrier layer is not as easy as is the case with the claimed thicknesses of the film. In addition, by laminating with such carrier layers as are usually used as an intermediate layer in laminated glass, a composite of the light coupling means that approximately corresponds to the standardised height of intermediate layers is easily obtained, which can then be immediately further processed by inserting it into a corresponding cutout in the intermediate layer.

In particular, for example, a microprism film having a height of approximately 300 μm can be laminated together with a standardised intermediate layer film having a height of approximately 500 μm to form the light coupling means, so that a height of approximately 800 μm is obtained for the light coupling means. This light coupling means can be inserted in the desired design, for example as a strip, into a corresponding cutout in an intermediate layer having a standardised height of 760 μm. This results in an intermediate product of uniform height which can be combined with the first and second panes and in some cases further intermediate or functional layers to form a glazing assembly according to the invention.

In a further preferred embodiment of the invention, the light source comprises at least one, preferably a plurality of, light-emitting diodes (LED, OLED).

The light source can be arranged on an end face of the first pane or in a recess of the first pane. Due to the efficient action of the light coupling means, it is possible to provide light sources that are less bright or a smaller number thereof in the glazing assembly according to the invention while maintaining the same brightness and reliable light guidance. The light source can also be arranged on a main surface of the first pane, in particular the main surface facing away from the intermediate layer.

The object is also achieved by a method for producing a glazing assembly according to the invention, at least comprising:

- laminating a multilayer film comprising at least one carrier layer and a microprism film and thereby providing a light coupling means, providing an intermediate layer, making a cutout in at least one thermoplastic layer of the intermediate layer, cutting the multilayer film of the light coupling means to size, inserting the cut piece of the light coupling means into the cutout of said at least one thermoplastic layer of the intermediate layer, and inserting the composite thus formed, consisting of the intermediate layer and the light coupling means, between a first pane and a second pane and connecting the elements by lamination.

To provide a light coupling means, a multilayer film consisting of at least one carrier layer and a microprism film is produced in a first step. Preferably, the carrier layer is laminated with the microprism film to form a multilayer film.

In a next step, an intermediate layer suitable for laminated glass panes is provided and one or more cutouts are made therein. The intermediate layer is preferably formed by a thermoplastic film or a plurality of thermoplastic films. The cutout is made in at least one thermoplastic film.

The cutouts can be made, for example, by cutting, especially on a plotter, or by punching.

The cutouts preferably have a shape that corresponds to the shape of the desired light coupling. In particular, the cutouts can be partially or completely strip-shaped, circular-arc-shaped, elliptical or square-shaped.

During the course of the manufacturing process before, parallel to or after the cutouts are made in the intermediate layer, the multilayer film of the light coupling means is cut to size. Here, too, any desired shape can be chosen. Preferably, the cut-to-size multilayer film can be partially or completely strip-shaped, circular-arc-shaped, elliptical or square-shaped. The shape of the cut pieces in the multilayer film determines the shape of the cutouts in the intermediate layer.

In a next step, the cut-to-size multilayer film of the light coupling means is inserted into the cutout(s) of the intermediate layer (or the at least one thermoplastic film). Measures may be taken to strengthen the bond between the light coupling means and the intermediate layer. The result is a composite of an intermediate layer and a light coupling means, which is arranged between the first pane and the second pane, and the elements are then connected by lamination.

The first pane and the second pane are laminated together via the intermediate layer, which has the composite partially consisting of light coupling means and intermediate layer, for example by autoclave processes, vacuum bag processes, vacuum ring processes, calendering processes, vacuum laminators, or combinations thereof. The panes are usually joined under the effect of heat, vacuum and/or pressure.

During the course of the manufacturing process before, parallel to or after the joining of the first pane, the intermediate layer with light coupling means and the second pane, at least one light source is arranged on the first or the second pane, preferably on a side edge or on the main surface of the first pane facing away from the intermediate layer.

The light source or light sources is/are arranged adjacent to or (with respect to the first pane) opposite at least one region of the light coupling means, for example adjacent to an edge region of a strip-shaped light coupling means. In addition to an arrangement on an end face of the first pane, it is preferred to arrange the light source(s) on the main surface of the first pane facing away from the intermediate layer. This avoids the need to make cutouts in the first pane and the position of the light source can be varied widely without the restrictions that would result from cutting out the glass.

With the method according to the invention, it is possible to produce an illuminable glazing assembly, as described above as inventive, within the framework of industrial production, without stress regions being produced in the finished glazing even with higher or thicker microprism films (larger than 150 μm). In addition, the process enables freely selectable shapes of the light coupling means, for example as a strip, circular arc section, circle or elliptical section, to be incorporated into the glazing assembly. This also makes it possible to achieve better light distribution and more targeted light output through good propagation of at least a large proportion of the light to be coupled in along the entire shape of the light coupling means and, based thereon, to provide fewer light sources.

The production of the multilayer film of the light coupling means from carrier layer and microprism film means that, in the step of inserting the light coupling means into the corresponding cutouts of the intermediate film, the height of the light coupling means is already adapted to the intermediate film. The intermediate layer thus bonded to the light coupling means can be further processed in the usual processes for producing glazing assemblies, in particular laminated panes for the construction or automotive industries.

In a preferred embodiment of the method according to the invention, the height of the laminated multilayer film of the light coupling means corresponds approximately to the height of the at least one thermoplastic layer of the intermediate layer with the cutout, and, after inserting the cut-to-size multilayer film into correspondingly designed recesses of the intermediate layer, the height difference is less than 10% of the height of said at least one thermoplastic layer of the intermediate layer, preferably less than 5%. This prevents stresses from occurring in the laminated pane in the region of the light coupling means during the manufacturing process. The amount of waste during production can be reduced, and a stable and durable connection of the elements of the glazing assembly can be achieved using standard industrial manufacturing steps.

The present invention further relates to the use of a glazing assembly according to the invention as a roof pane of a vehicle. The first pane is preferably the pane facing the vehicle interior, while the second pane faces the outside environment.

Within the scope of the present invention, all embodiments mentioned with regard to individual features can also be freely combined with one another, as long as they are not contradictory.

In the following, the invention is explained in more detail with reference to figures and exemplary embodiments. The figures are schematic representations and not to scale. The figures do not limit the invention in any way.

Figure 2:
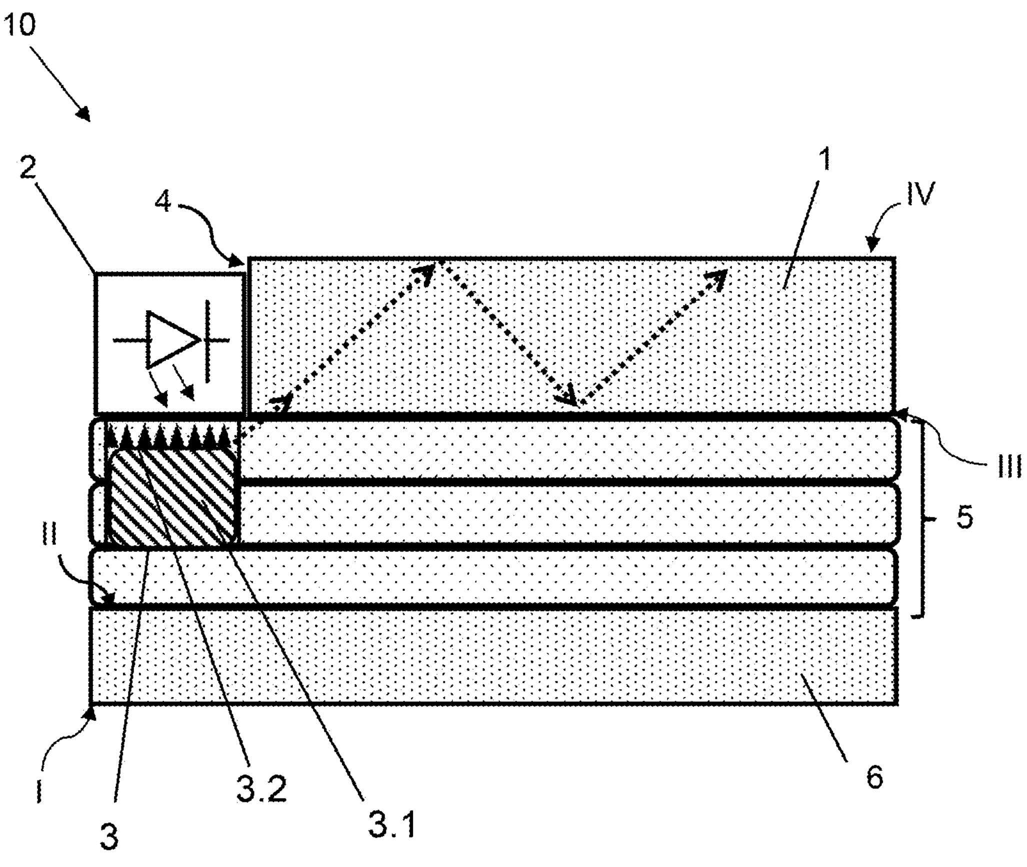
Figure 3:
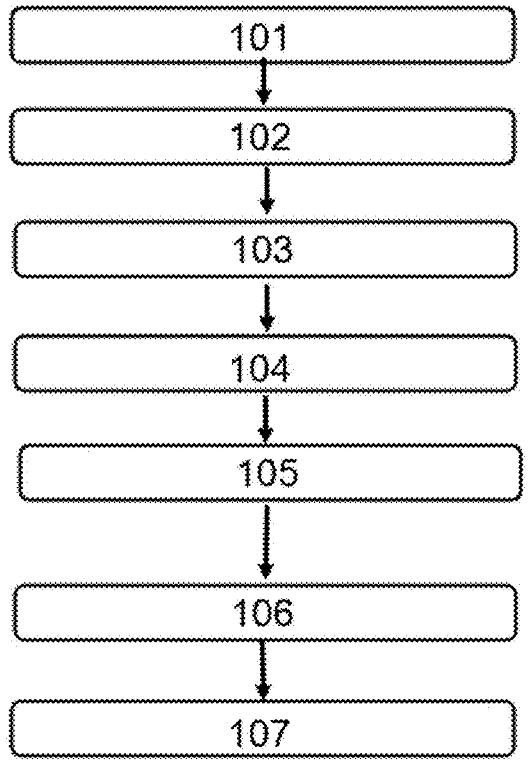

In the drawings:

FIG. 1 is a schematic cross-sectional view of an embodiment of a glazing assembly according to the invention comprising a laminated pane, FIG. 2 is a schematic cross-sectional view of a further embodiment of a glazing assembly according to the invention comprising a laminated pane, and FIG. 3 shows a flowchart of an embodiment of a method according to the invention.

FIG. 1 shows a cross-sectional view of a glazing assembly 10 according to the invention. The glazing assembly 10 comprises a first pane 1, a second pane 6 and a light source 2. The laminated pane can be an automobile glazing, a construction glazing or components of a piece of furniture or electrical device. The glazing assembly 10 is, for example, a roof pane of a vehicle. The glazing assembly 10 can also be part of an insulating glazing unit and can serve, for example, as an outer pane or inner pane in a window of a building. Furthermore, the glazing assembly 10 can be installed in an interior and can serve, for example, as glazing of a conference room.

The first pane 1 has a first main surface IV and a second main surface III opposite the first main surface IV. The first pane 1 is limited by four circumferential end faces 4, also called side faces. For example, the first pane 1 is made of soda-lime glass and its dimensions are 1.4 m×1.5 m. The first pane 1 has a thickness of 3 mm. The thickness of the first pane can be adapted to the particular use. The first pane 1 can have prestressed, partially prestressed or non-prestressed glass. Alternatively, the first pane 1 can consist of a plastic, for example polycarbonate.

In the glazing assembly 10, the light source 2 is arranged such that light is coupled into the pane 1. In the embodiment shown, the light source 2 is arranged on the main surface IV of the first pane 1. However, it can equally be arranged on one end face 4 of the pane. The light source 2 is provided to emit light in the visible region. Alternatively, it can emit infrared or ultraviolet light.

The first pane 1 is connected to a second pane 6 via an intermediate layer 5, so that the composite forms a claimed glazing assembly 10. For this purpose, the intermediate layer 5 lies flat against a main surface II of the second pane 6 and oppositely against the main surface III of the first pane 1.

The second pane 6 is limited by four circumferential end faces 4, also called side faces. The second pane 6 consists, for example, of soda-lime glass, and its dimensions are 1.4 m×1.5 m. The second pane 6 has a thickness of 1, 1.5, 2 or 3 mm. The thickness of the second pane can be adapted to the respective use. The second pane 6 can have prestressed, partially prestressed or non-prestressed glass. Alternatively, the second pane 6 can consist of a plastics material, for example polycarbonate.

The intermediate layer 5 is preferably transparent or tinted or coloured. The intermediate layer 5 preferably contains at least one plastics material, for example PVB. The intermediate layer 5 is formed by a single film, the height of the film being, for example, 0.76 mm. The intermediate layer 5 is thermoplastic and, after lamination, bonds the first pane 1 and the second pane 6 together.

Adjacent to the light source 2, the intermediate layer 5 has a cutout in which the light coupling means 3 designed as a multilayer film is arranged. The multilayer film of the light coupling means 3 comprises at least one carrier layer 3.1 and a microprism film 3.2, and its height is matched to the height of the intermediate layer 5, so that the height difference between the two elements is a maximum of 80 μm, but is preferably less than 50 μm.

The carrier layer 3.1 is particularly preferably formed from a material having a similar or even higher refractive index than that of the first pane 1, but it can equally comprise another material that is very compatible with the material of the intermediate layer. In the embodiment of the invention shown here, the carrier layer is transparent for the light emitted by the light source 2. In this way, the portion of the emitted light that radiates onto the light coupling means 3 can easily pass through the carrier layer onto the microprism film 3.2. The light coupling means is intended to deflect a large part of the transmitted light arriving from the light source into the first pane 1 by scattering, refraction, diffraction or, in particular, reflection.

The intermediate layer preferably contains or is made of at least one plastics material, preferably ethylene vinyl acetate (EVA), and/or polyethylene terephthalate (PET). The carrier layer can, however, also contain for example polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The carrier layer can be formed by one or even by a plurality of films arranged one over another, wherein the height of a film is preferably from 0.025 mm to 1 mm, typically 0.38 mm or 0.76 mm.

The carrier layer is preferably glued, laminated or otherwise firmly connected to the microprism film to form the light coupling means. The microprism film itself is particularly known from traffic engineering as reflective film, from lighting technology or from display technology, for example as brightness enhancement film (BEF). This can in particular be a film which comprises a base layer, preferably an adhesive one, and a microprism layer arranged on the base layer. In this case, in the sense of the present invention, the base layer of the microprism film is, therefore, present in addition to the carrier layer of the light coupling means. In other words, the carrier layer, the base layer and the microprism layer are all comprised in the light coupling means.

The microprism films usable in the sense of the invention are commercially available, for example from the companies 3M, MNTech, Shinwa, Zeon Chemicals, SKC, or Dupont, and illustrative examples of microprism films are also disclosed in the U.S. Pat. Nos. 4,588,258, 4,775,219, 4,895,428, 5,138,488, 5,387,458, 5,450,235, 5,605,761, 5,614,286 and 5,691,846. A scratch-resistant coated microprism film is described, for example, in the publication US 2007/0254146 A1. The prism structures of such a microprism film are in particular transparent and made of a polyacrylate or polycarbonate, for example PMA or PMMA. Typical heights of the prisms are in the range of approx. 20 μm-25 μm. The base layer of a typical microprism film is preferably made of PET or PVB and its typical height is approx. 100 μm to 150 μm, but it can also be in the range of approx. 30 μm-40 μm.

In particular, in the region adjacent to the cutout of the intermediate layer 5 into which the light coupling means 3 is inserted, the intermediate layer 5 can be tinted black.

FIG. 2 shows a further embodiment of a glazing assembly 10 according to the invention as a laminated pane. The basic arrangement of the first pane 1, the second pane 6 and the intermediate layer 5 connecting both panes, which is already shown in FIG. 1, is also implemented here. A light source 2 is arranged on a side surface 4 of the first pane 1, the light of which light source is coupled into the first pane 1. In addition, a light coupling means 3 in the form of a multilayer film comprising at least one carrier layer 3.1 and a microprism film 3.2 connected to the carrier layer is used to couple in the light emitted by the light source 2.

In contrast to the embodiment of FIG. 1, this embodiment of the invention comprises a plurality of thermoplastic films, in the present case three films arranged one above the other, which together form the intermediate layer 5. Two adjacent films have a cutout, wherein the cutouts of the films form a recess of the entire intermediate layer 5, into which the light coupling means 3 is inserted. The third film, which faces away from the first pane 1, has no cutout.

In the embodiment shown, the light coupling means 3 is inserted into a cutout of the intermediate layer 5, which comprises in height two of the three layers forming the intermediate layer 5. The height of the light coupling means 3 is thus matched to the height of two layers of the intermediate layer. The third layer of the intermediate layer 5 is designed to be continuous, i.e. there is no cutout in this layer.

Furthermore, the microprism surface of the light coupling means 3 in the shown embodiment of the invention is oriented in the direction of the light source 2. In this case, the carrier layer 3.1 of the light coupling means 3 can also be tinted or coloured.

FIG. 3 shows a flowchart of an embodiment of a method according to the invention for producing the illuminable glazing assembly 10. The method comprises the following steps:

101: laminating a multilayer film comprising at least one carrier layer 3.1 and a microprism film 3.2 and thereby providing a light coupling means 3,

102: providing an intermediate layer 5,

103: making cutouts in the intermediate layer 5,

104: cutting the multilayer film of the light coupling means 3 to size,

105: inserting the cut pieces of the light coupling means 3 into the cutouts of the intermediate film 5,

106: inserting the composite thus formed from intermediate film 5 and light coupling means 3 between a first pane 1 and a second pane 6 and connecting the elements by lamination,

107: arranging at least one light source 2 on the first or second pane 1, 6.

In steps 103 and/or 104, for example, automated plotters can be used which cut the desired shape out of a flat film, for example by laser cutting. Alternatively or additionally, cutting the light coupling means 3 to size and/or making the cutouts in the intermediate film 5 can be carried out by punching. Step 105 may be performed either before or after placing the intermediate film 5 on a main surface of the first or second pane.

LIST OF REFERENCE SIGNS

1 First pane
2 Light source
3 Light coupling means
3.1 Carrier layer
3.2 Microprism film
4 Side surface
5 Intermediate layer
6 Second pane
10 Glazing assembly
I Second main surface of the second pane 6
II First main surface of the second pane 6
III Second main surface of the first pane 1
IV First main surface of the first pane 1

The invention claimed is:

1. A glazing assembly comprising:

a first pane having a first main surface and a second main surface, wherein the first pane is provided to at least partially transmit coupled-in light, a light source for generating light that is coupled into the first pane, a second pane having a first main surface and a second main surface, an intermediate layer arranged between the first pane and the second pane, a light coupling means which is arranged in a cutout of at least one thermoplastic layer of the intermediate layer, wherein the light coupling means is formed from a multilayer film, wherein the multilayer film comprises at least one carrier layer and a microprism film.

2. The glazing assembly according to claim 1, wherein a height of the light coupling means corresponds approximately to a height of said at least one thermoplastic layer of the intermediate layer.

3. The glazing assembly according to claim 1, wherein the light coupling means is arranged in a tinted region of the intermediate layer.

4. The glazing assembly according to claim 3, wherein the light coupling means is arranged in a blackened region of the intermediate layer.

5. The glazing assembly according to claim 1, wherein the microprism film of the multilayer film of the light coupling means has a height in the range between 25 μm and 500 μm.

6. The glazing assembly according to claim 5, wherein the microprism film of the multilayer film of the light coupling means has a height in the range between 25 μm and 400 μm.

7. The glazing assembly according to claim 6, wherein the microprism film of the multilayer film of the light coupling means has a height greater than or equal to 150 μm and less than or equal to 350 μm.

8. The glazing assembly according to claim 1, wherein the light source comprises at least one light-emitting diode.

9. The glazing assembly according to claim 8, wherein the light source comprises a plurality of light-emitting diodes.

10. A method comprising providing a glazing assembly according to claim 1 as a roof pane of a vehicle.

11. A method for producing a glazing assembly that includes a first pane having a first main surface and a second main surface, wherein the first pane is provided to at least partially transmit coupled-in light, a light source for generating light that is coupled into the first pane, a second pane having a first main surface and a second main surface, an intermediate layer arranged between the first pane and the second pane, a light coupling means which is arranged in the intermediate layer, wherein the light coupling means is formed from a multilayer film, wherein the multilayer film comprises at least one carrier layer and a microprism film, the method, comprising:

laminating the multilayer film comprising the at least one carrier layer and the microprism film and thereby providing the light coupling means, providing the intermediate layer, making a cutout in at least one thermoplastic layer of the intermediate layer, cutting the multilayer film of the light coupling means to size, inserting the cut piece of the light coupling means into the cutout of said at least one thermoplastic layer of the intermediate layer, inserting the composite thus formed from intermediate layer and light coupling means between the first pane and the second pane and connecting the elements by lamination, arranging at least one light source on the first or second pane.

12. The method according to claim 11, wherein a height of the laminated multilayer film of the light coupling means corresponds approximately to a height of said at least one thermoplastic layer of the intermediate layer and after inserting the cut-to-size multilayer film into correspondingly designed recesses of the intermediate layer, a height difference is less than 10% of the height of said at least one thermoplastic layer of the intermediate layer.

13. The method according to claim 12, wherein the height difference is less than 5% of the height of said at least one thermoplastic layer of the intermediate layer.

* * * * *